(12) United States Patent
Huang et al.

(10) Patent No.: US 10,779,004 B2
(45) Date of Patent: Sep. 15, 2020

(54) METHODS AND APPARATUSES OF CONSTRAINED MULTI-TYPE-TREE BLOCK PARTITION FOR VIDEO CODING

(71) Applicant: MEDIATEK INC., Hsin-Chu (TW)

(72) Inventors: Han Huang, San Jose, CA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 113 days.

(21) Appl. No.: 15/729,831

(22) Filed: Oct. 11, 2017

(65) Prior Publication Data

US 2018/0103268 A1    Apr. 12, 2018

Related U.S. Application Data

(60) Provisional application No. 62/521,568, filed on Jun. 19, 2017, provisional application No. 62/407,074, filed on Oct. 12, 2016.

(51) Int. Cl.
| | |
|---|---|
| *H04N 19/593* | (2014.01) |
| *H04N 19/119* | (2014.01) |
| *H04N 19/169* | (2014.01) |
| *H04N 19/91* | (2014.01) |
| *H04N 19/176* | (2014.01) |
| *H04N 19/159* | (2014.01) |
| *H04N 19/96* | (2014.01) |

(52) U.S. Cl.
CPC ......... *H04N 19/593* (2014.11); *H04N 19/119* (2014.11); *H04N 19/159* (2014.11); *H04N 19/176* (2014.11); *H04N 19/1883* (2014.11); *H04N 19/91* (2014.11); *H04N 19/96* (2014.11)

(58) Field of Classification Search
USPC .................................................. 375/240.12
See application file for complete search history.

(56) References Cited

U.S. PATENT DOCUMENTS

| | | | |
|---|---|---|---|
| 2011/0134998 A1 | 6/2011 | Lee et al. | |
| 2017/0208336 A1* | 7/2017 | Li | H04N 19/44 |
| 2018/0070110 A1* | 3/2018 | Chuang | H04N 19/96 |

FOREIGN PATENT DOCUMENTS

| | | |
|---|---|---|
| WO | 2014/120367 A1 | 8/2014 |
| WO | 2017/206826 A1 | 12/2017 |
| WO | 2018/013706 A1 | 1/2018 |
| WO | 2018/049020 A1 | 3/2018 |

\* cited by examiner

*Primary Examiner* — Christopher S Kelley
*Assistant Examiner* — Ana Picon-Feliciano
(74) *Attorney, Agent, or Firm* — McClure, Qualey & Rodack, LLP

(57) ABSTRACT

A video coding system receives input data of a current block split from a parent block, and determines if the parent block is split by horizontal triple tree (TT) partitioning or vertical TT partitioning. A partition type selecting from TT partitioning and binary tree (BT) partitioning and a partition direction selecting from horizontal partitioning and vertical partitioning for splitting the current block are determined by prohibiting a horizontal partitioning type if the parent block is split by horizontal TT partitioning, and prohibiting a vertical partitioning type if the parent block is split by vertical TT partitioning, where the horizontal partitioning type and the vertical partitioning type depend on whether the current block is a middle sub-block in the parent block. The video coding system processes the current block according to the partition type and the partition direction.

19 Claims, 14 Drawing Sheets

```
prediction_tree( xPt, yPt, log2PtWidth, log2PtHeight, ptType, ptDir, x0, y0, log2CbWidth,
log2CbHeight ) {
    pt_split_flag
    if( pt_split_flag) {
        pt_split_dir
        if( pt_split_dir == HOR ) {
            if( !(ptType == TT && ptDir == HOR && x0 == xPt &&
y0 == yPt+ (1<<(log2PtHeight-2)) ) )
                pt_split_type
            if( pt_split_type == BT ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_type == TT ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            }
        } else
        if( pt_split_dir == VER ) {
            if( !(ptType == TT && ptDir == VER && x0 == xPt+(1<<(log2ptWidth-2)) &&
y0 == yPt ) )
                pt_split_type
            if( pt_split_type == BT ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<( log2CbWidth-1)), y0, log2CbWidth-1, log2CbHeight )
            } else
            if( pt_split_type == TT ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<( log2CbWidth -2)+(1<<( log2CbWidth-1)), y0, log2CbWidth-2, log2CbHeight )
            }
        }
    } else
        coding_unit(x0, y0, log2CbWidth, log2CbHeight)
```

Fig. 10A

```
prediction_tree( xPt, yPt, log2PtWidth, log2PtHeight, ptType, ptDir, x0, y0, log2CbWidth,
log2CbHeight ) {
    pt_split_flag
    if( pt_split_flag) {
        pt_split_dir
        if( pt_split_dir == HOR ) {
            if( !(ptType == TT && ptDir == HOR && x0 == xPt &&
y0 != yPt+ (1<<(log2PtHeight-2)) )
                pt_split_type
                if( pt_split_type == BT ) {
                    prediction_tree( x0, y0, log2CbWidth, log2CbHeight, BT, HOR,
x0, y0, log2CbWidth, log2CbHeight-1 )
                    prediction_tree( x0, y0, log2CbWidth, log2CbHeight, BT, HOR,
x0, y0+(1<<( log2CbHeight-1)), log2CbWidth, log2CbHeight-1 )
                } else
                if( pt_split_type == TT ) {
                    prediction_tree( x0, y0, log2CbWidth, log2CbHeight, TT, HOR,
x0, y0, log2CbWidth, log2CbHeight-2 )
                    prediction_tree( x0, y0, log2CbWidth, log2CbHeight, TT, HOR,
x0, y0+(1<<(log2CbHeight-2)), log2CbWidth, log2CbHeight-1 )
                    prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
                }
        } else
        if( pt_split_dir == VER ) {
            if( !(ptType == TT && ptDir == VER && x0 != xPt+(1<<(log2ptWidth-2)) &&
y0 == yPt) )
                pt_split_type
                if( pt_split_type == BT ) {
                    prediction_tree( x0, y0, log2CbWidth, log2CbHeight, BT, VER,
x0, y0, log2CbWidth-1, log2CbHeight )
                    prediction_tree( x0, y0, log2CbWidth, log2CbHeight, BT, VER,
x0+(1<<( log2CbWidth-1)), y0, log2CbWidth-1, log2CbHeight )
                } else
                if( pt_split_type == TT ) {
                    prediction_tree( x0, y0, log2CbWidth, log2CbHeight, TT, VER,
x0, y0, log2CbWidth-2, log2CbHeight )
                    prediction_tree( x0, y0, log2CbWidth, log2CbHeight, TT, VER,
x0+(1<<(log2CbWidth-2)), y0, log2CbWidth-1, log2CbHeight )
                    prediction_tree( x0, y0, log2CbWidth, log2CbHeight, TT, VER,
x0+(1<<( log2CbWidth -2)+(1<<( log2CbWidth-1)), y0, log2CbWidth-2, log2CbHeight )
                }
        }
    } else
        coding_unit(x0, y0, log2CbWidth, log2CbHeight)
}
```

Fig. 10B

```
prediction_tree( xPt, yPt, log2PtWidth, log2PtHeight, ptType, ptDir, x0, y0, log2CbWidth,
log2CbHeight ) {
    pt_split_flag
    if( pt_split_flag ) {
        pt_split_dir
        if( pt_split_dir == HOR ) {
            if( !(ptType == TT && ptDir == HOR) )
                pt_split_type
            if( pt_split_type == BT ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_type == TT ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            }
        } else
        if( pt_split_dir == VER ) {
            if( !(ptType == TT && ptDir == VER) )
                pt_split_type
            if( pt_split_type == BT ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<( log2CbWidth-1)), y0, log2CbWidth-1 )
            } else
            if( pt_split_type == TT ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<( log2CbWidth -2))+(1<<( log2CbWidth-1)), y0, log2CbWidth-2, log2CbHeight )
            }
        }
    } else
        coding_unit(x0, y0, log2CbWidth, log2CbHeight)
```

Fig. 10C

```
prediction_tree( xPt, yPt, log2PtWidth, log2PtHeight, pfType, ptDir, x0, y0, log2CbWidth,
log2CbHeight ) {
    pt_split_flag
    if( pt_split_flag) {
        pt_split_type
        if( pt_split_type == BT ) {
            pt_split_dir
            if( pt_split_dir == HOR ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_dir == VER ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<(log2CbWidth-1)), y0, log2CbWidth-1, log2CbHeight )
            }
        } else
        if( pt_split_type == TT ) {
            pt_split_dir
            if( pt_split_dir == HOR ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            } else
            if( pt_split_dir == VER ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<(log2CbWidth-2))+(1<<(log2CbWidth-1)), y0, log2CbWidth-2, log2CbHeight )
            }
        }
    } else
        coding_unit(x0, y0, log2CbWidth, log2CbHeight)
```

Fig. 11A

```
prediction_tree( xPt, yPt, log2PtWidth, log2PtHeight, ptType, ptDir, x0, y0, log2CbWidth,
log2CbHeight ) {
    pt_split_flag
    if( pt_split_flag) {
        pt_split_type
        if( pt_split_type == BT ) {
            if( !(ptType == TT && ptDir == HOR && x0 == xPt && y0 ==
yPt+(1<<(log2PtHeight-2)) ) && !(ptType == TT && ptDir == VER && x0 ==
xPt+(1<<(log2PtWidth-2)) && y0 == yPt))
                pt_split_dir
            if( pt_split_dir == HOR ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_dir == VER ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<(log2CbWidth-1)), y0, log2CbWidth-1, log2CbHeight )
            }
        } else
        if( pt_split_type == TT ) {
            pt_split_dir
            if( pt_split_dir == HOR ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            } else
            if( pt_split_dir == VER ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<(log2CbWidth-2))+(1<<(log2CbWidth-1)), y0, log2CbWidth-2, log2CbHeight )
            }
        }
    } else
        coding_unit(x0, y0, log2CbWidth, log2CbHeight)
}
```

Fig. 11B

```
prediction_tree( xPt, yPt, log2PtWidth, log2PtHeight, ptType, ptDir, x0, y0, log2CbWidth,
log2CbHeight ) {
    pt_split_flag
    if( pt_split_flag) {
        pt_split_type
        if( pt_split_type == BT ) {
            pt_split_dir
            if( pt_split_dir == HOR ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_dir == VER ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<(log2CbWidth-1)), y0, log2CbWidth-1, log2CbHeight )
            }
        } else
        if( pt_split_type == TT ) {
            if( !(ptType == TT && ptDir == HOR && x0 == xPt && y0 !=
yPt+(1<<(log2PtHeight-2)) ) && !(ptType == TT && ptDir == VER && x0 !=
xPt+(1<<(log2PtWidth-2)) && y0 == yPt))
            pt_split_dir
            if( pt_split_dir == HOR ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            } else
            if( pt_split_dir == VER ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<(log2CbWidth-2))+(1<<(log2CbWidth-1)), y0, log2CbWidth-2, log2CbHeight )
            }
        }
    } else
        coding_unit(x0, y0, log2CbWidth, log2CbHeight)
}
```

Fig. 11C

```
prediction_tree( xPt, yPt, log2PtWidth, log2PtHeight, ptType, ptDir, x0, y0, log2CbWidth,
log2CbHeight ) {
    pt_split_flag
    if( pt_split_flag) {
        pt_split_type
        if( pt_split_type == BT ) {
            if( !(ptType == TT && ptDir == HOR && x0 == xPt && y0 ==
yPt+(1<<(log2PtHeight-2)) ) && !(ptType == TT && ptDir == VER && x0 ==
xPt+(1<<(log2PtWidth-2)) && y0 == yPt))
                pt_split_dir
            if( pt_split_dir == HOR ) {
                prediction_tree( x0, y0, log2CbWidth, log2CbHeight, BT, HOR,
x0, y0, log2CbWidth, log2CbHeight-1 )
                prediction_tree( x0, y0, log2CbWidth, log2CbHeight, BT, HOR,
x0, y0+(1<<( log2CbHeight-1)), log2CbWidth, log2CbHeight-1 )
            } else
            if( pt_split_dir == VER ) {
                prediction_tree( x0, y0, log2CbWidth, log2CbHeight, BT, VER,
x0, y0, log2CbWidth-1, log2CbHeight )
                prediction_tree( x0, y0, log2CbWidth, log2CbHeight, BT, VER,
x0+(1<<(log2CbWidth-1)), y0, log2CbWidth-1, log2CbHeight )
            }
        } else
        if( pt_split_type == TT ) {
            if( !(ptType == TT && ptDir == HOR && x0 == xPt && y0 !=
yPt+(1<<(log2PtHeight-2)) ) && !(ptType == TT && ptDir == VER && x0 !=
xPt+(1<<(log2PtWidth-2)) && y0 == yPt))
                pt_split_dir
            if( pt_split_dir == HOR ) {
                prediction_tree( x0, y0, log2CbWidth, log2CbHeight, TT, HOR,
x0, y0, log2CbWidth, log2CbHeight-2 )
                prediction_tree( x0, y0, log2CbWidth, log2CbHeight, TT, HOR,
x0, y0+(1<<(log2CbHeight-2)), log2CbWidth, log2CbHeight-1 )
                prediction_tree( x0, y0, log2CbWidth, log2CbHeight, TT, HOR,
x0, y0+(1<<(log2CbHeight-2))+(1<<(log2CbHeight-1)), log2CbWidth, log2CbHeight-2 )
            } else
            if( pt_split_dir == VER ) {
                prediction_tree( x0, y0, log2CbWidth, log2CbHeight, TT, VER,
x0, y0, log2CbWidth-2, log2CbHeight )
                prediction_tree( x0, y0, log2CbWidth, log2CbHeight, TT, VER,
x0+(1<<(log2CbWidth-2)), y0, log2CbWidth-1, log2CbHeight )
                prediction_tree( x0, y0, log2CbWidth, log2CbHeight, TT, VER,
x0+(1<<(log2CbWidth-2))+(1<<(log2CbWidth-1)), y0, log2CbWidth-2, log2CbHeight )
            }
        }
    } else
        coding_unit(x0, y0, log2CbWidth, log2CbHeight)
```

Fig. 11D

METHODS AND APPARATUSES OF CONSTRAINED MULTI-TYPE-TREE BLOCK PARTITION FOR VIDEO CODING

CROSS REFERENCE TO RELATED APPLICATIONS

The present invention claims priority to U.S. Provisional Patent Application, Ser. No. 62/407,074, filed Oct. 12, 2016, entitled "Methods and apparatus of constrained multi-type-tree block partition for video coding" and U.S. Provisional Patent Application, Ser. No. 62/521,568, filed Jun. 19, 2017, entitled "Methods and apparatus of constrained multi-type-tree block partition for video coding". The U.S. Provisional Patent Applications are hereby incorporated by reference in their entireties.

FIELD OF THE INVENTION

The present invention relates to constrained block partitioning in video coding systems. In particular, the present invention relates to determine a partition type and partition direction for splitting a current block by conditionally prohibiting a partition type and partition direction.

BACKGROUND AND RELATED ART

High Efficiency Video Coding (HEVC) is the latest international video coding standard developed by the Joint Collaborative Team on Video Coding (JCT-VC) group of video coding experts from ITU-T Study Group. The HEVC standard relies on a block-based coding structure which divides a picture into multiple non-overlapped square Coding Tree Units (CTUs). Each CTU consists of multiple Coding Tree Blocks (CTBs) and each CTB is for one color component. The CTUs in a slice are processed according to a raster scan order; and each CTU is further recursively divided into Coding Units (CUs) according to a quadtree partitioning method to adapt to various local characteristics. FIG. 1 illustrates an exemplary system block diagram of a Video Encoder 100 based on the HEVC standard. Intra Prediction 110 provides intra predictors based on reconstructed blocks of a current picture, and Inter Prediction 112 performs motion estimation (ME) and motion compensation (MC) to provide inter predictors based on video data from other picture or pictures. Switch 114 selects an intra predictor from Intra Prediction 110 or an inter predictor from Inter Prediction 112 for each block in the current picture. The selected predictor is supplied to Adder 116 to be subtracted from the input video data in order to form prediction errors, also called residues. The prediction errors are then processed by Transformation (T) 118 followed by Quantization (Q) 120. The transformed and quantized residues are then coded by Entropy Encoder 134 to form a video bitstream corresponding to the compressed video data. The video bitstream associated with the transform coefficients is then packed with side information. The side information may also be subject to entropy coding to reduce required bandwidth, and the data associated with the side information are provided to Entropy Encoder 134 as shown in FIG. 1. When an inter prediction mode is selected, a reference picture or pictures have to be reconstructed at the encoder end as well. Consequently, the transformed and quantized residues are processed by Inverse Quantization (IQ) 122 and Inverse Transformation (IT) 124 to recover the residues. The residues are then added back to the selected predictors at Reconstruction (REC) 126 to produce reconstructed blocks. The reconstructed blocks may be stored in Reference Picture Buffer 132 and used for prediction of other pictures.

As shown in FIG. 1, incoming video data undergoes a series of video processing in the video encoding system. The reconstructed blocks generated from REC 126 may be subject to various impairments due to a series of encoding processing. Accordingly, various in-loop processing is applied to the reconstructed blocks before the reconstructed blocks are stored in the Reference Picture Buffer 132 in order to improve video quality. In the HEVC standard, Deblocking Filter (DF) 128 and Sample Adaptive Offset (SAO) 130 are applied to the reconstructed blocks before storing in the Reference Picture Buffer 132 to enhance picture quality. The in-loop filter information may have to be incorporated in the video bitstream so that a decoder can properly recover the required information.

FIG. 2 illustrates a system block diagram of an exemplary HEVC-based Video Decoder 200. Entropy Decoder 210 is used to parse and recover the coded syntax elements related to residues, motion information and other control data. Switch 216 selects Intra Prediction 212 or Inter Prediction 214 according to decoded mode information, and the selected predictors are supplied to reconstruction (REC) 218 to be combined with the recovered residues. Besides performing entropy decoding on compressed video data, Entropy Decoder 210 is also responsible for entropy decoding of side information and provides the side information to respective blocks. For example, intra mode information is provided to Intra Prediction 212, inter mode information is provided to Inter Prediction 214, sample adaptive offset information is provided to SAO 226 and residues are provided to Inverse Quantization (IQ) 220. The residues are processed by IQ 220, Inverse Transformation (IT) 222 and subsequent reconstruction process to produce reconstructed blocks. The reconstructed blocks are further processed by DF 224 and SAO 226 to generate final decoded video. If the currently decoded picture is a reference picture, the final decoded video of the currently decoded picture is also stored in Ref. Pict. Buffer 228 for later pictures in decoding order.

FIG. 3A illustrates an example of the quadree (QT) partitioning method applied in the HEVC standard to split a block into four smaller sub-blocks. Alternative partitioning methods called binary tree (BT) block partitioning and triple tree (TT) block partitioning split a block into two smaller sub-blocks and three smaller sub-blocks respectively. FIGS. 3B and 3C illustrate symmetrical vertical splitting and symmetrical horizontal splitting according to binary tree block partitioning. For a given block of size M×N, the size of the two smaller sub-blocks is M/2×N if symmetrical vertical splitting is used; otherwise the size is M×N/2 if symmetrical horizontal splitting is used. Triple tree partitioning method is designed to capture objects which locate in the block center while quadtree and binary tree partitioning methods always split along the block center. FIG. 3D illustrates vertical center-side triple tree partitioning, and FIG. 3E illustrates horizontal center-side triple tree partitioning. The triple tree partitioning method may provide capability to faster localize small object along block boundaries, by allowing one-quarter partitioning vertically or horizontally.

Although the binary tree and triple tree partitioning methods supports more partition shapes and thus is more flexible than the quadtree partitioning method, the coding complexity and signaling overhead increase for selecting the best partition shape among all possible partition shapes. A combined partitioning method called Quad-Tree-Binary-Tree (QTBT) structure combines a quadtree partitioning method with a binary tree partitioning method, which balances the coding efficiency and the coding complexity of the two partitioning methods. An exemplary QTBT structure is shown in FIG. 4A, where a given block such as a CTU is first partitioned by a quadtree partitioning method then a binary tree partitioning method. FIG. 4A illustrates an example of block partitioning structure according to the QTBT partitioning method and FIG. 4B illustrates a coding tree diagram for the QTBT block partitioning structure shown in FIG. 4A. The solid lines in FIGS. 4A and 4B indicate quadtree partitioning while the dotted lines indicate binary tree partitioning. In each non-leaf splitting node of the binary tree structure, one flag indicates which splitting type is used, 0 indicate symmetrical horizontal splitting and 1 indicates symmetrical vertical splitting. The QTBT partitioning method may be used to split a CTU into CUs, where the CUs are called binary tree leaf nodes and are used for prediction and transform without any further partitioning.

Multi-Type-Tree (MTT) block partitioning extends the concept of the two-level tree structure in QTBT by allowing both the binary tree and triple tree partitioning methods in the second level of MTT. The two levels of trees in MTT are called region tree (RT) and prediction tree (PT) respectively. The first level RT is always quadtree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached, for example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic Coding Unit (CU) for prediction and transform and will not be further split.

FIG. 5 illustrates an example of tree-type signaling for block partitioning according to MTT block partitioning. RT signaling may be similar to the quadtree signaling in QTBT block partitioning. For signaling a PT node, one additional bin is signaled to indicate whether it is a binary tree partitioning or triple tree partitioning. For a block split by RT, a first bin is signaled to indicate whether there is another RT split, if the block is not further split by RT (i.e. the first bin is 0), a second bin is signaled to indicate whether there is a PT split. If the block is also not further split by PT (i.e. the second bin is 0), then this block is a leaf node. If the block is then split by PT (i.e. the second bin is 1), a third bin is sent to indicate horizontal or vertical partitioning followed by a fourth bin for distinguishing binary tree (BT) or triple tree (TT) partitioning.

While the proposed MTT is able to improve performance by adaptively partitioning blocks for prediction and transform, it is desirable to further improve the performance whenever possible in order to achieve an overall efficiency target.

BRIEF SUMMARY OF THE INVENTION

Methods and apparatuses of video processing for a video coding system with constrained block partitioning are disclosed. Embodiments of the video coding system according to a first or second method receive input data associated with a current block in a current picture, where the current block is split from a parent block. The video coding system determines if the parent block is split by horizontal triple tree (TT) partitioning or vertical TT partitioning, and determines whether the current block is a middle sub-block in the parent block. A partition type selecting from BT and TT partitioning and a partition direction selecting from horizontal and vertical partitioning are determined for splitting the current block by prohibiting a horizontal partition type if the parent block is split by horizontal TT partitioning and prohibiting a vertical partition type if the parent block is split by vertical TT partitioning. The prohibited horizontal partition type and the prohibited vertical partition type depend on whether the current block is the middle sub-block of the parent block. The video coding system processes the current block according to the partition type and the partition direction, for example the current block is split according to the partition type and the partition direction for prediction and transform in video encoding process or video decoding process.

In some embodiments of the first method, the prohibited horizontal partitioning type is horizontal binary tree (BT) partitioning and the prohibited vertical partitioning type is vertical BT partitioning when the current block is the middle sub-block of the parent block. In cases when the syntax of partition direction is signaled before the syntax of partition type, the partition type for splitting the current block is not signaled and is inferred to be TT partitioning if the parent block is split by horizontal TT partitioning, the current block is the middle sub-block of the parent block, and the partition direction is horizontal partitioning. Similarly, the partition type for splitting the current block is not signaled and is inferred to be TT partitioning if the parent block is split by vertical TT partitioning, the current block is the middle sub-block of the parent block, and the partition direction is vertical partitioning. In cases when the syntax of partition type is signaled before the syntax of partition direction, the partition direction for splitting the current block may not be signaled and may be inferred to be vertical partitioning if the parent block is split by horizontal TT partitioning, the current block is the middle sub-block of the parent block, and the partition type is BT partitioning. The partition direction for splitting the current block may not be signaled and may be inferred to be horizontal partitioning if the parent block is split by vertical TT partitioning, the current block is the middle sub-block of the parent block, and the partition type is BT partitioning In some embodiments of the second method, the prohibited horizontal partitioning type is horizontal TT partitioning and the prohibited vertical partitioning type is vertical TT partitioning when the current block is not the middle sub-block of the parent block. For example, the current block is a top or bottom sub-block generated from horizontal TT partitioning or the current block is a left or right sub-block generated from vertical TT partitioning. In cases when the syntax of partition direction is signaled before the syntax of partition type, the partition type for splitting the current block may not be signaled and may be inferred to be BT partitioning if the parent block is split by horizontal TT partitioning, the current block is not the middle sub-block of the parent block, and the partition direction is horizontal partitioning. The partition type for splitting the current block may not be signaled and may be inferred to be BT partitioning if the parent block is split by vertical TT partitioning, the current block is not the middle sub-block of the parent block, and the partition direction is vertical partitioning. In cases when the syntax of partition type is signaled before the syntax of partition direction, the partition direction for splitting the current block may not be signaled and may be inferred to be vertical partitioning if the parent block is split by horizontal TT partitioning, the current block is not the middle sub-block of the parent block, and the partition type is TT partitioning. Similarly, the partition direction for splitting the current block may not signaled and may be inferred to be horizontal partitioning if the parent block is split by vertical TT partitioning, the current block is not the middle sub-block of the parent block, and the partition type is TT partitioning.

Some other embodiments of the video coding system according to a third or fourth method receive input data associated with a current block in a current picture, where the current block is a second sub-block split from a parent block by binary tree (BT) partitioning or the current block is a third sub-block split from a parent block by triple tree (TT) partitioning. The video coding system determines a parent partition type and a parent partition direction for splitting the parent block, where the partition type is selecting from BT partitioning and TT partitioning, and the partition direction is selecting from horizontal partitioning and vertical partitioning, and also determines if a first sub-block split from the parent block by BT partitioning or both first and second sub-blocks split from the parent block by TT partitioning is/are further split by a first partition type different from the parent partition type and a first partition direction different from the parent partition direction. For example, the first partition type is TT partitioning if the parent partition type is BT partitioning and the first partition direction is vertical partitioning if the parent partition direction is horizontal partitioning. A current partition type and a current partition direction for splitting the current block are determined by prohibiting splitting the current block by the first partition type and the first partition direction. The video coding system processes the current block according to the current partition type and the current partition direction. For example, prediction and transform in video encoding or decoding process are applied to sub-block split from the current block by the current partition type and the current partition direction.

In some embodiments of the third method, the first sub-block and second sub-block split from the parent block are top and bottom sub-blocks respectively if the parent block is split by horizontal BT partitioning, and the first sub-block and second sub-block split from the parent block are left and right sub-blocks respectively if the parent block is split by vertical BT partitioning. The first partition type and the first partition direction for splitting the first sub-block are TT partitioning and vertical partitioning if the parent block is split by horizontal BT partitioning, and the first partition type and the first partition direction for splitting the first sub-block are TT partitioning and horizontal partitioning if the parent block is split by vertical BT partitioning. In cases when the syntax of the current partition direction is signaled before the syntax of the current partition type, the current partition type may not be signaled and may be inferred to be BT partitioning if the current partition direction is vertical partitioning, the parent block is split by horizontal BT partitioning and the first sub-block is further split by vertical TT partitioning. Similarly, the current partition type may not be signaled and may be inferred to be BT partitioning if the current partition direction is horizontal partitioning, the parent block is split by vertical BT partitioning and the first sub-block is further split by horizontal TT partitioning.

In cases when the syntax of the current partition type is signaled before the syntax of the current partition direction, an embodiment of the modified third method may not signal the current partition type as the current partition type may be inferred to be horizontal partitioning if the current partition type is TT partitioning, the parent block is split by horizontal BT partitioning and the first sub-block is further split by vertical TT partitioning. The current partition direction may not be signaled and may be inferred to be vertical partitioning if the current partition type TT partitioning, the parent block is split by vertical BT partitioning, and the first sub-block is further split by horizontal TT partitioning.

In some embodiments of the fourth method, the first sub-block, second sub-block, and third sub-block split from the parent block are top, middle, and bottom sub-blocks respectively if the parent block is split by horizontal TT partitioning, and the first sub-block, second sub-block, and third sub-block split from the parent block are left, middle, and right sub-blocks respectively if the parent block is split by vertical TT partitioning. The first partition type and the first partition direction for splitting the first and second sub-blocks are BT partitioning and vertical partitioning if the parent block is split by horizontal TT partitioning, and the first partition type and the first partition direction for splitting the first and second sub-blocks are BT partitioning and horizontal partitioning if the parent block is split by vertical TT partitioning. In cases when the syntax of the current partition direction is signaled before the syntax of the current partition type, the current partition type may not be signaled and may be inferred to be TT partitioning if the current partition direction is horizontal partitioning, the parent block is split by vertical TT partitioning and the first and second sub-blocks are further split by horizontal BT partitioning. Similarly, the current partition type may not be signaled and may be inferred to be TT partitioning if the current partition direction is vertical partitioning, the parent block is split by horizontal TT partitioning and the first and second sub-blocks are further split by vertical BT partitioning.

In cases when the syntax of the current partition type is signaled before the syntax of the current partition direction, an embodiment of the modified fourth method may not signal the current partition direction and infer the current partition direction as horizontal partitioning if the current partition type is BT partitioning, the parent block is split by horizontal TT partitioning and the first and second sub-blocks are further split by vertical BT partitioning. An embodiment of the modified fourth method may not signal the current partition direction and infer the current partition direction as vertical partitioning if the current partition type is BT partitioning, the parent block is split by vertical TT partitioning, and the first sub-block is further split by horizontal BT partitioning.

The above embodiments of the first and second methods may be combined, and one or both of the first and second methods may be combined with one of the third and fourth methods.

BRIEF DESCRIPTION OF THE DRAWINGS

FIGS. 10A-10C are tables illustrating examples of parsing of prediction tree for the first method, the second method, and both the first and second methods respectively.

FIG. 11A is a table illustrating an alternative parsing method which signals the partition type before the partition direction.

FIGS. 11B-11D are tables illustrating examples of parsing of prediction tree for the modified first method, the modified second method, and both the modified first and second methods respectively when applying the alternative parsing method.

DETAILED DESCRIPTION OF THE INVENTION

In order to reduce signaling overhead and improve the performance of Multi-Type-Tree (MTT) partitioning method, embodiments of constrained block partitioning methods are disclosed. Some embodiments of the constrained block partitioning methods involve modified encoding or decoding processing by prohibiting a certain partition type and partition direction for splitting a current sub-block according to the partition type and partition direction of a previous partition level and a position of the current sub-block. Some embodiments of the constrained block partitioning method involve modified encoding or decoding process which infer the partition type or partition direction for splitting a current sub-block according to the partition type and partition direction of a previous partition level and a position of the current sub-block.

First Method of Constrained Block Partitioning

Figure 6A:
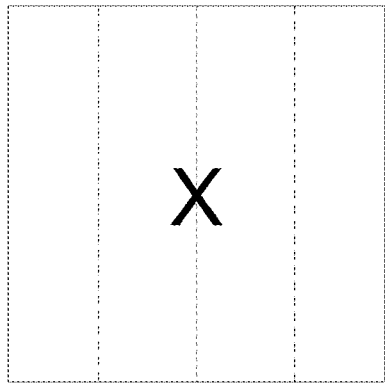
FIGS. 6A-6B illustrate prohibited binary tree partitioning for splitting the middle sub-blocks generated by triple tree partitioning according to the first method of the present invention.
Figure 6B:
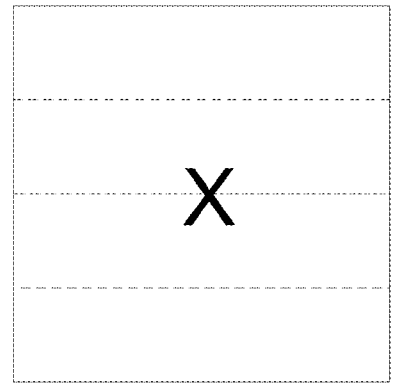

In one embodiment according to the first method of the present invention, vertical binary tree (BT) partitioning is disabled for further splitting a middle sub-block split by vertical triple tree (TT) partitioning as shown in FIG. 6A. The sparse dash lines in FIG. 6A indicate vertical TT partitioning at a previous partition level (e.g. level i) and the dotted line indicates vertical BT partitioning at a current partition level (e.g. level i+1) that is prohibited for splitting the middle sub-block. BT partitioning is prohibited to further split the middle sub-block resulted from TT partitioning because the resulting sub-blocks will be exactly the same as applying BT partitioning at both the previous partition level and the current partition level. Similarly, in another embodiment according to the first method of the present invention, horizontal BT partitioning is disabled for further splitting a middle sub-block split by horizontal TT partitioning as shown in FIG. 6B. The sparse dash lines in FIG. 6B indicate horizontal TT partitioning at a previous partition level (e.g. level i) and the dotted line indicates horizontal BT partitioning at a current partition level (e.g. level i+1) that is not allowed.

An embodiment of a video encoder or video decoder checks if a current middle sub-block generated by vertical TT partitioning is further split by vertical partitioning, for example by checking the partition direction for splitting the current middle sub-block, and the video encoder or video decoder infers the partition type as TT partitioning if the current middle sub-block is further split by vertical partitioning. It is because vertical BT partitioning is prohibited to split the current middle sub-block as shown in FIG. 6A. One bin for indicating the partition type between BT and TT partitioning is no longer needed to be signaled for this case.

An embodiment of the video encoder or video decoder checks if a current middle sub-block generated by horizontal TT partitioning is further split by horizontal partitioning, and if the current middle sub-block is further split by horizontal partitioning, the video encoder or video decoder infers the partition type as TT partitioning because horizontal BT partitioning is prohibited as shown in FIG. 6B. There is no need to signal a bin to indicate whether it is BT or TT partitioning.

Second Method of Constrain Block Partitioning

Figure 7A:
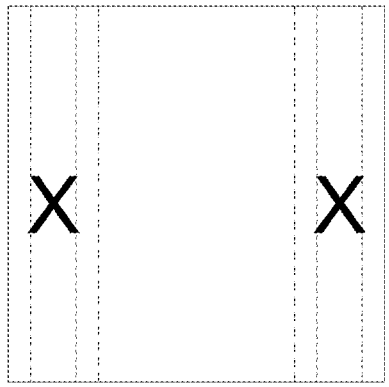
FIG. 7A illustrates prohibited vertical triple tree partitioning for splitting the left or right sub-block generated by vertical triple tree partitioning according to the second method of the present invention.
Figure 7B:
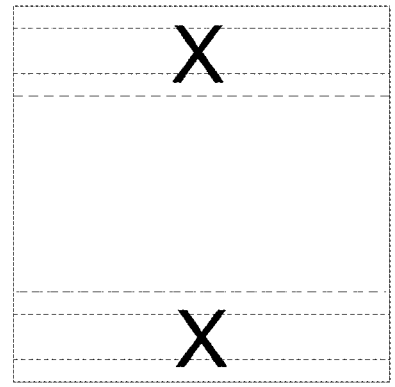
FIG. 7B illustrates prohibited horizontal triple tree partitioning for splitting the top or bottom sub-block generated by horizontal triple tree partitioning according to the second method of the present invention.

An embodiment of the second method prohibits vertical TT partitioning applied to a left or right sub-block split from vertical TT partitioning as shown in FIG. 7A. Another embodiment of the second method prohibits horizontal TT partitioning applied to a top or bottom sub-block split from horizontal TT partitioning as shown in FIG. 7B. The sparse dash lines in FIGS. 7A and 7B indicate TT partitioning at a previous partition level (e.g. level i) and the dotted lines in FIGS. 7A and 7B indicate TT partitioning at a current partition level (e.g. level i+1) that are not allowed.

To process a current block that is a left or right sub-block generated by vertical TT partitioning, an exemplary video encoder or video decoder checks if the left or right sub-block is further split by vertical partitioning, and the video encoder or video decoder infers a current partition type for splitting the current block as BT partitioning when the current block is further split by vertical partitioning. The left or right sub-block generated by vertical TT partitioning cannot be further split by vertical TT partitioning according to the second method. Similarly, the video encoder or video decoder checks if a top or bottom sub-block generated by horizontal TT partitioning is further split by horizontal partitioning, and the video encoder or video decoder infers the current partition type as BT partitioning when the top or bottom sub-block is further split by horizontal partitioning. The top or bottom sub-block generated by horizontal TT partitioning cannot be further split by horizontal TT partitioning according to the second method.

Some embodiments combine the first and second methods, for example, if a current block is a sub-block generated by horizontal TT partitioning and is decided to be further split by horizontal partitioning, the partition type of the current block is inferred without signaling a bin to indicate whether it is BT or TT partitioning. The inferred partition type depends on the position of the current block, for example, if the current block is a top or bottom sub-block and is further split by horizontal partitioning, the inferred partition type is BT partitioning; else if the current block is a middle sub-block and is further split by horizontal partitioning, the inferred partition type is TT partitioning.

Similarly, if a sub-block generated by vertical TT partitioning is decided to be further split by vertical partitioning, the partition type of the sub-block is inferred without signaling a bin to indicate whether it is BT or TT partitioning. The inferred partition type depends on the position of the sub-block, for example, if the left or right sub-block is further split by vertical partitioning, the inferred partition type is BT partitioning; else if the middle sub-block is further split by vertical partitioning, the inferred partition type is TT partitioning.

Third Method of Constrained Block Partitioning

Figure 8A:
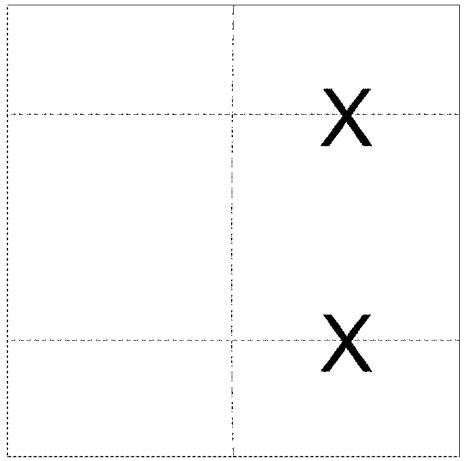
FIG. 8A illustrates prohibited horizontal triple tree partitioning for splitting the second sub-block generated by vertical binary tree partitioning when the first sub-block is further split by horizontal triple tree partitioning.
Figure 8B:
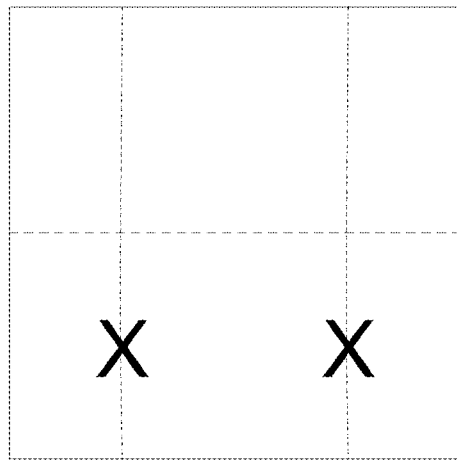
FIG. 8B illustrates prohibited vertical triple tree partitioning for splitting the second sub-block generated by horizontal binary tree partitioning when the first sub-block is further split by vertical triple tree partitioning.

FIGS. 8A and 8B illustrate examples of prohibited triple tree partitioning for splitting a second sub-block generated by binary tree partitioning according to the third method of the present invention. A vertical BT partitioning is first applied at a previous partition level (e.g. level i), and a first sub-block, which is the left sub-block, is determined to be further split by horizontal TT partitioning at a current partition level (e.g. level i+1) as shown in FIG. 8A. Embodiments of the third method prohibit horizontal TT partitioning to be applied to the second sub-block, which is the right sub-block, at the current partition level. The sparse dash lines in FIGS. 8A and 8B indicate BT partitioning at level i and the dotted lines indicate prohibited TT partitioning at level i+1. If the second sub-block generated by the BT partitioning is determined to be further horizontal partitioned at the current partition level, there is no need to signal a flag for the partition type to indicate whether it is TT or BT partitioning. Embodiments of the video encoder or the video decoder infer the partition type for the second sub-block at the current partition level to be BT partitioning if the second sub-block is determined to be horizontal partitioned. FIG. 8B illustrates a current block is first split by horizontal BT partitioning at a previous partition level (e.g. level i), and a first sub-block, which is the top sub-block, is determined to be further split by vertical TT partitioning at a current partition level (e.g. level i+1). Vertical TT partitioning applied on a second sub-block, which is the bottom sub-block, is prohibited according to an embodiment of the third method. Embodiments of the video encoder or video decoder infers the partition type to be BT partitioning if the second sub-block is determined to be further split by vertical partitioning at the current partition level, thus there is no need to signal a flag for the partition type to control whether it is BT or TT partitioning.

According to the third method, it is allowed to split a current block by horizontal TT partitioning at a previous partition level and further split each sub-block by vertical BT partitioning at a current partition level, and similarly, it is allowed to split the current block by vertical TT partitioning at a previous partition level and further split each sub-block by horizontal BT partitioning at a current partition level. The two examples of prohibited triple tree partitioning shown in FIGS. 8A and 8B therefore prevent redundant partitioning.

Embodiments of the third method may be combined with the first method, or combined with the second method, or even combined with both the first and second methods.

Fourth Method of Constrained Block Partitioning

Figure 9A:
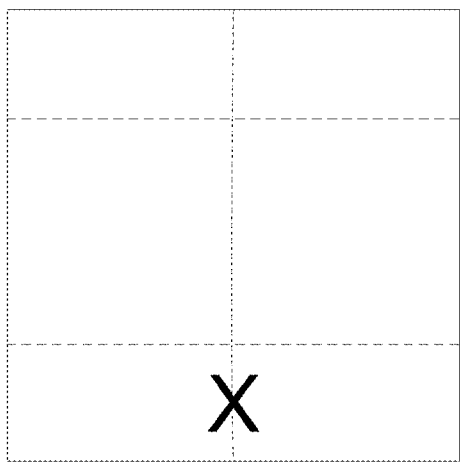
FIG. 9A illustrates prohibited vertical binary tree partitioning for splitting the third sub-block generated by horizontal triple tree partitioning when the first and second sub-blocks are further split by vertical binary tree partitioning.
Figure 9B:
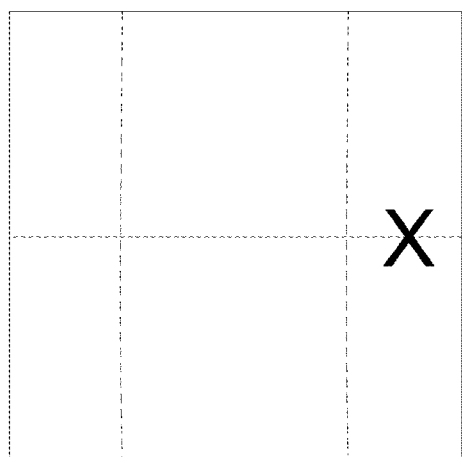
FIG. 9B illustrates prohibited horizontal binary tree partitioning for splitting the third sub-block generated by vertical triple tree partitioning when the first and second sub-blocks are further split by horizontal binary tree partitioning.

On the contrary, a fourth method is an alternation to the third method. The fourth method allows a current block to be split by vertical BT partitioning at a previous partition level then each sub-block is split by horizontal TT partitioning at a current partition level, and the fourth method also allows the current block to be split by horizontal BT partitioning at a previous partition level then each sub-block is split by vertical TT partitioning at a current partition level. The opposite order of partitioning is thus prohibited to avoid redundancy. FIGS. 9A and 9B illustrate two examples of prohibited binary tree partitioning for a third sub-block generated by triple tree partitioning according to the fourth method of the present invention. In FIG. 9A, horizontal TT partitioning is first applied at a previous partition level (e.g. level i), the first and second sub-blocks, which are the top and middle sub-blocks, are determined to be further partitioned by vertical BT partitioning at a current partition level (e.g. level i+1). An embodiment of the fourth method prohibits vertical BT partitioning of the third sub-block (i.e. the bottom sub-block) at the current partition level. Embodiment of the fourth method infers the partition type to be TT partitioning if the third sub-block generated by horizontal TT partitioning is further split by vertical partitioning and the first and second sub-blocks are already split by vertical BT partitioning. There is no need to signal a flag for the partition type to control whether it is TT or BT partitioning when the third sub-block generated by horizontal TT partitioning is to be split by vertical partitioning.

FIG. 9B illustrates a case when applying vertical TT partitioning to a parent block at a previous partition level (i.e. level i) followed by applying horizontal BT partitioning to the first and second sub-blocks (i.e. the left and middle sub-blocks) at a current partition level (i.e. level i+1), horizontal BT partitioning is not allowed to be applied to the third sub-block (i.e. the right sub-block) at the current partition level. Embodiment of the fourth method infers the partition type to be TT partitioning if the third sub-block generated by vertical TT partitioning is further split by horizontal partitioning and the first and second sub-blocks are already split by horizontal BT partitioning. There is no need to signal a flag for the partition type to control whether it is TT or BT partitioning when the third sub-block generated by vertical TT partitioning is to be split by horizontal partitioning.

The fourth method may be combined with the first method, or combined with the second method, or combined with both the first and second methods.

Parsing

An example of parsing of prediction tree according to the first method is shown in FIG. 10A, an example of parsing of prediction tree according to the second method is shown in FIG. 10B, and an example of parsing of prediction tree according to both the first and second methods is shown in FIG. 10C. In FIGS. 10A-10C, a coordinate (xPt, yPt) is used to indicate the location of a top-left sample of a parent block. Variables log 2PtWidth and log 2PtHeight are the log 2 value of the width and height of the parent block, a variable ptType indicates prediction tree (PT) partition type of the parent block, which can be either binary tree (BT) or triple tree (TT). A variable ptDir indicates the partition direction of the parent block, which can be either horizontal partitioning (HOR) or vertical partitioning (VER). A coordinate (x0, y0) is used to indicate the location of a top-left sample of a current block split from the parent block. Variables log 2CbWidth and log 2CbHeight are the log 2 value of the width and height of the current block. pt_split_flag is the syntax element of the PT split flag, which indicates whether a block is further split, pt_split_dir is the syntax element of the PT partition direction, which indicates whether the block is horizontal partitioning or vertical partitioning. Pt_split_type is the syntax element of the PT partition type, which indicates whether the block is BT partitioning or TT partitioning. In FIGS. 10A-10C, a syntax element in bold typeface means parsing of the syntax element, else it means determining the value of the syntax element. The function coding_unit( . . . ) is for the parsing process for a block that is not further split. In FIG. 10A, if pt_split_type is not parsed, the partition type is inferred as TT partitioning (i.e. pt_split_type is set as TT). In FIG. 10B, if pt_split_type is not parsed, the partition type is inferred as BT partitioning (i.e. pt_split_type is set as BT). In FIG. 10C, if pt_split_type is not parsed, the partition type is inferred according to the partition direction of the parent block and the location of the current block. An exemplary code for determining the inferred partition type is shown in the following.

```
if ptDir == HOR
    pt_split_type = x0 == xPt &&
    y0 == yPt + (1<< (log2PtHeight−2))? TT:BT;
else if ptDir ==VER
    pt_split_type = x0 ==xPt +
    (1<<(log2PtWidth−2)) && y0 == yPt? TT:BT.
```

Modified First and Second Methods Based on Alternative Parsing Method

Figure 1:
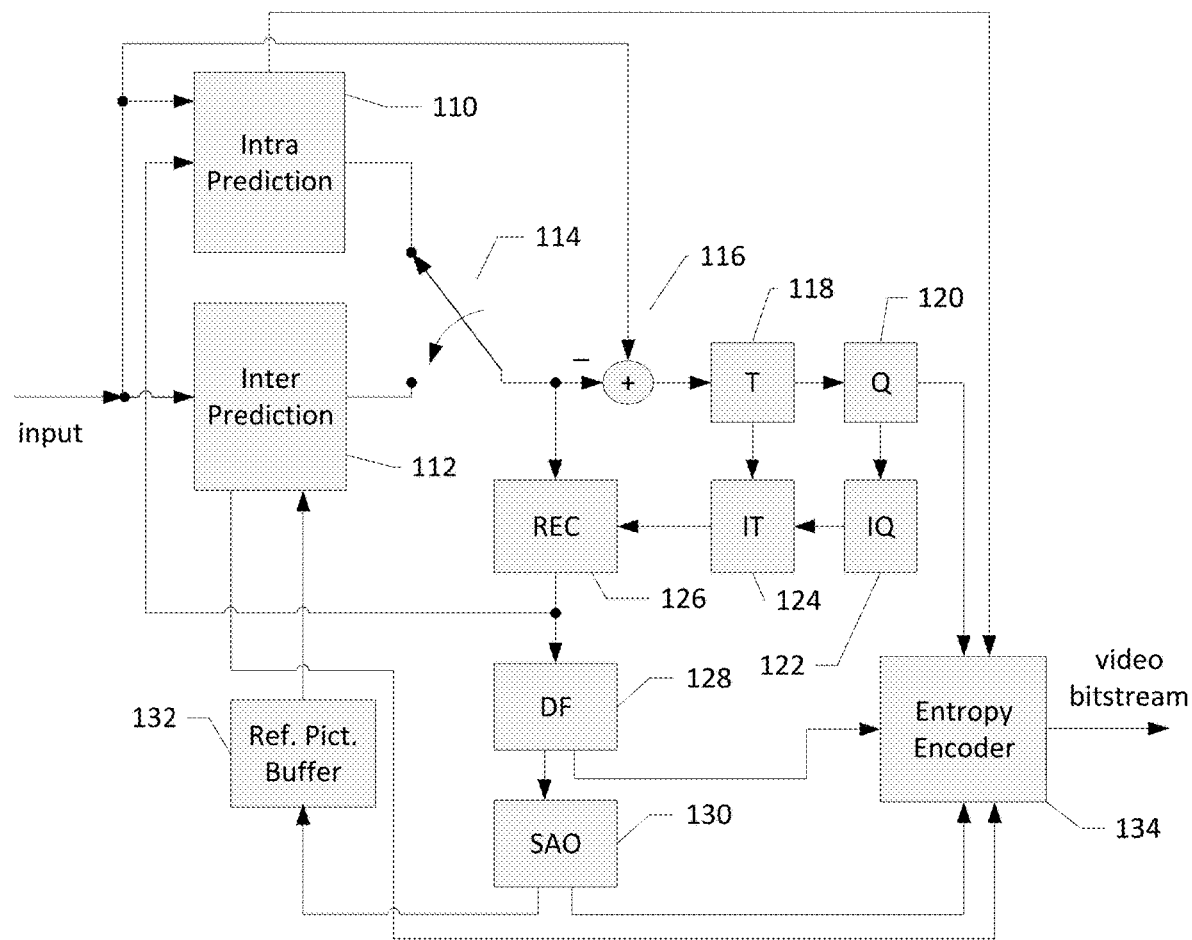
FIG. 1 illustrates a block diagram of an exemplary video encoding system based on the High Efficiency Video Coding (HEVC) standard.
Figure 2:
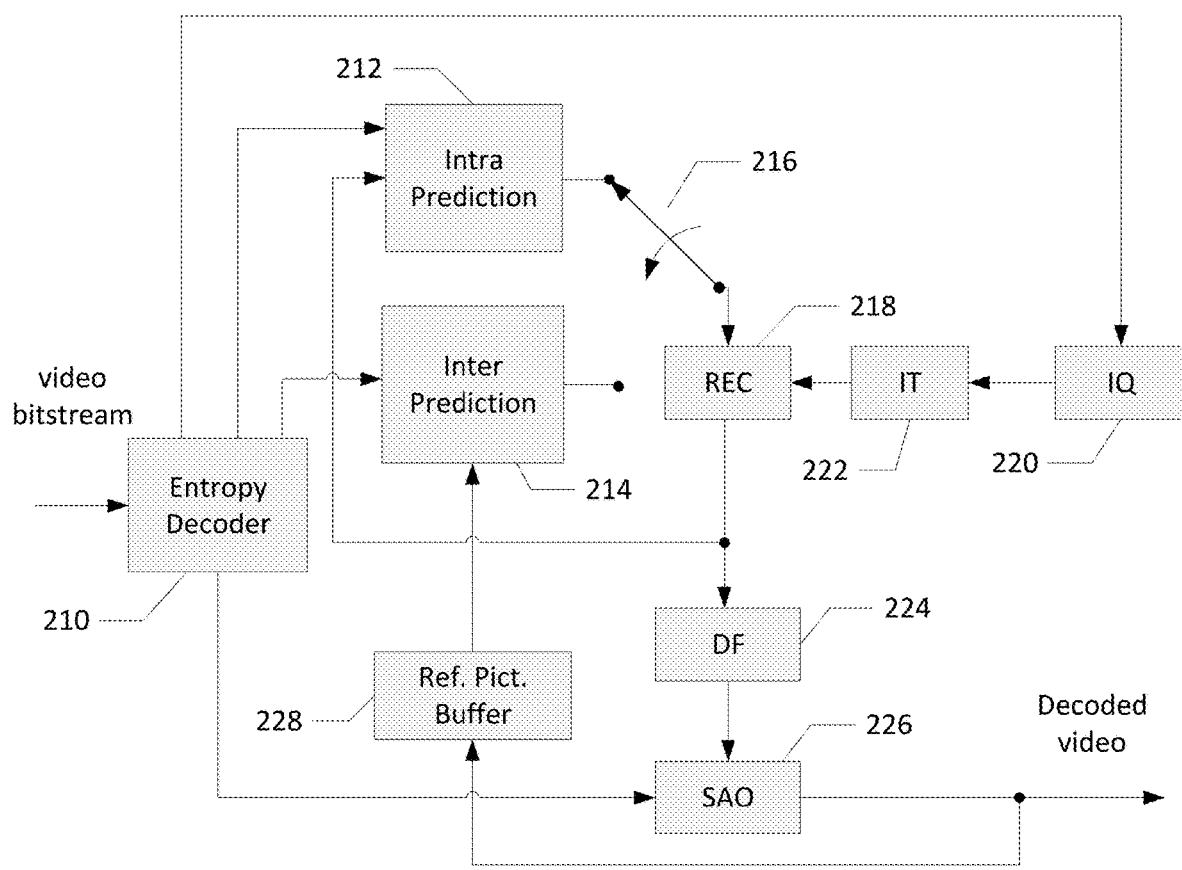
FIG. 2 illustrates a block diagram of an exemplary video decoding system based on the High Efficiency Video Coding (HEVC) standard.
Figure 3A:
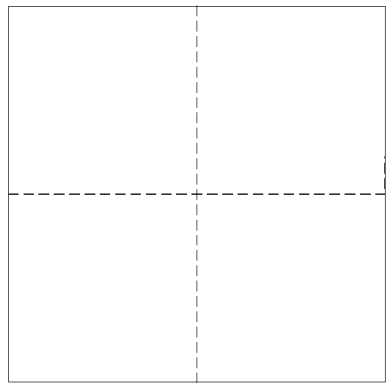
FIGS. 3A-3E illustrate examples of block split by quadtree partitioning, binary tree partitioning, and triple tree partitioning.
Figure 3B:
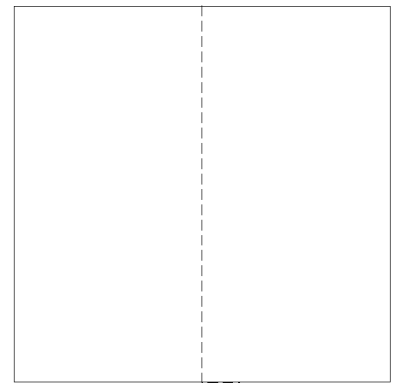
Figure 3C:
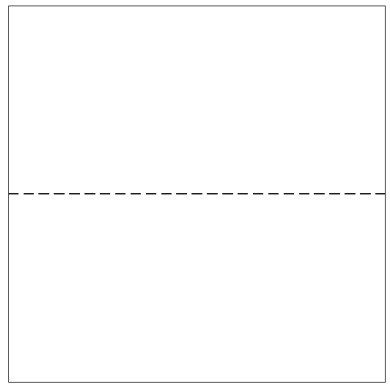
Figure 3D:
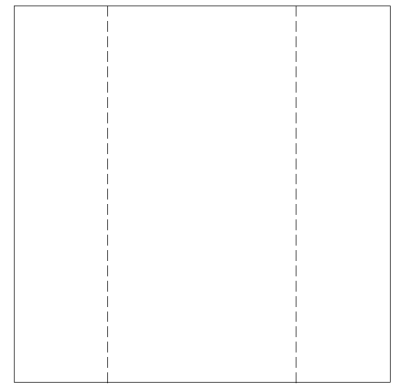
Figure 3E:
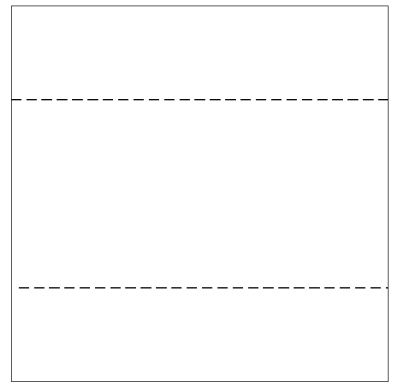
Figure 4A:
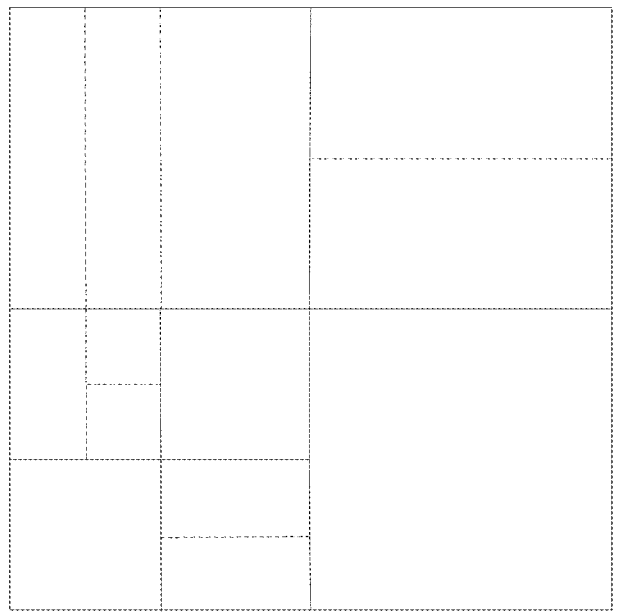
FIG. 4A illustrates an exemplary block partitioning structure of a Quad-Tree-Binary-Tree (QTBT) partitioning method.
Figure 4B:
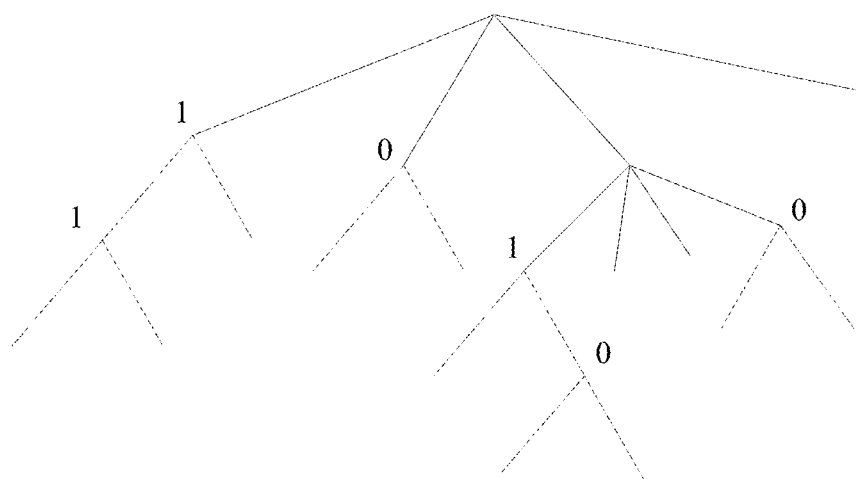
FIG. 4B illustrates a coding tree structure corresponding to the block partitioning structure of FIG. 4A.
Figure 5:
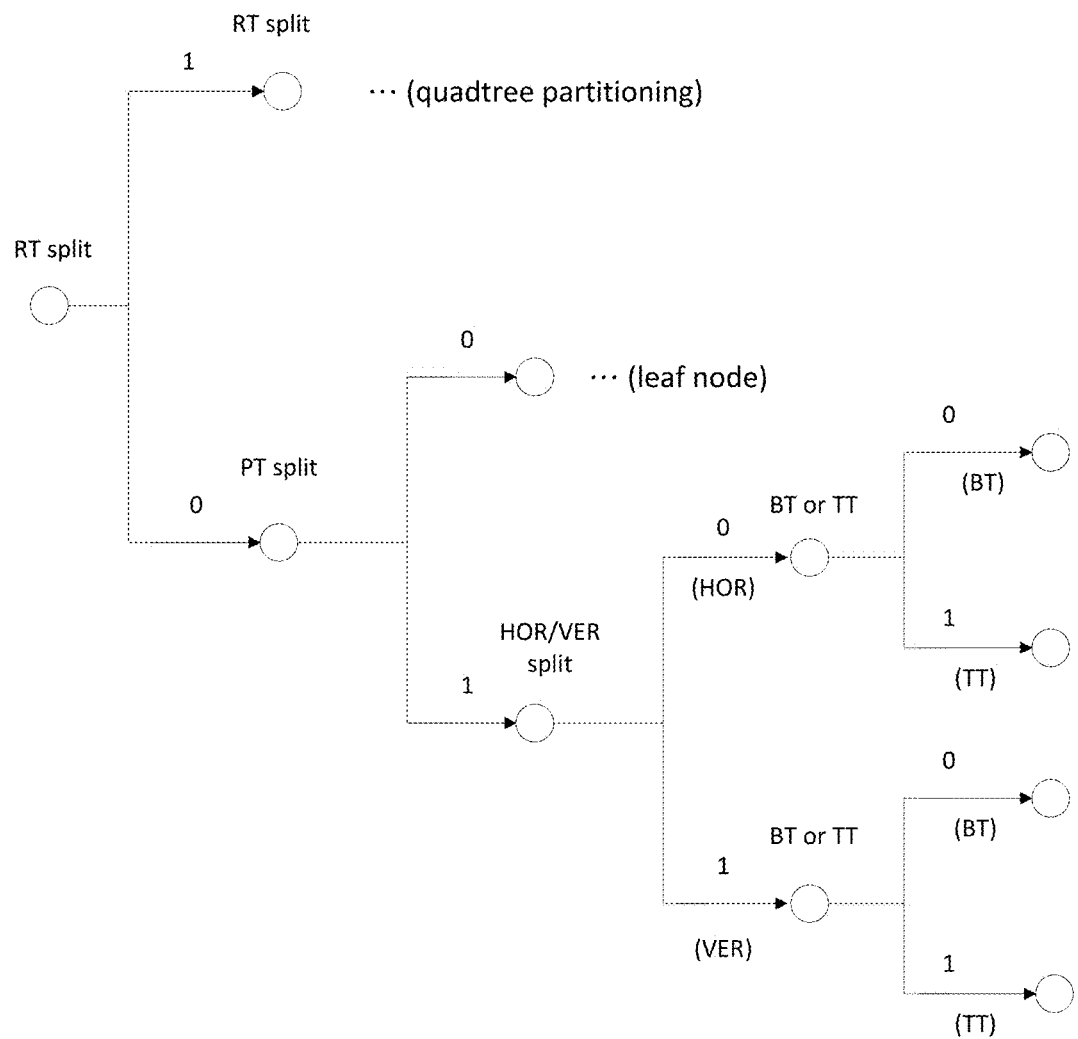
FIG. 5 illustrates an example of partition signaling for Multi-Type-Tree (MTT) block partitioning.

The partition signaling for Multi-Type-Tree (MTT) block partitioning as shown in FIG. 5 transmits the syntax for partition direction (HOR or VER) before the syntax for partition type (BT or TT). An alternative parsing method for the original design of the MTT is also proposed, in which, the syntax for the partition type is signaled before the syntax for the partition direction. An example of parsing prediction tree is shown in FIG. 11A.

The first method may be modified accordingly if the alternative parsing method is applied. According to the first method, the middle sub-block generated by horizontal TT partitioning cannot be further split by horizontal BT partitioning, so the partition direction is inferred to be vertical partitioning if the middle sub-block generated by horizontal TT partitioning is further split by BT partitioning. There is no need to signal a bin for indicating the partition direction to be horizontal or vertical. Similarly, since the middle sub-block generated by vertical TT partitioning cannot be further split by vertical BT partitioning, the partition direction is inferred to be horizontal partitioning if the middle sub-block generated by vertical TT partitioning is further split by BT partitioning. There is no need to signal a bin to indicate the partition direction to be horizontal or vertical. An example of parsing prediction tree according to the modified first method is shown in FIG. 11B. If the partition type of the parent block ptType is TT partitioning, the partition type of the current block pt_split_type is BT, and the current block is a middle sub-block, then the partition direction for the current block is not parsed and can be inferred based on the partition direction of the parent block (i.e. pt_split_dir=ptDir==HOR? VER: HOR).

The second method is also modified to infer the partition direction according to the partition type if the alternative parsing method is applied. According to the second method, a top or bottom sub-block generated by horizontal TT partitioning cannot be further split by horizontal TT partitioning. The modified second method infers the partition direction to be vertical partitioning if the top or bottom sub-block generated by horizontal TT partitioning is further split by TT partitioning. There is no need to signal a bin to indicate whether the partition direction is horizontal or vertical partitioning. Similarly, the second method prohibits a left or right sub-block generated by vertical TT partitioning to be further split by vertical TT partitioning. The modified second method infers the partition direction to be horizontal partitioning if the left or right sub-block generated by vertical TT partitioning is further split by TT partitioning. There is no need to signal a bin to indicate whether the partition direction is horizontal or vertical. An example of parsing prediction tree according to the modified second method is shown in FIG. 11C. If the partition type of a parent block ptType is TT, the partition type for the current block pt_split_type is also TT, and the current block is not a middle sub-block, the partition direction for the current block pt_split_dir is not parsed and may be inferred according to the partition direction of the parent block (i.e. pt_split_dir=ptDir==HOR?VER:HOR).

The modified first and second methods may be both applied in an embodiment of the video encoder or video decoder, and an example of parsing prediction tree is shown in FIG. 11D. In this embodiment, when the partition type of the parent block ptType is TT, the partition type for the current block pt_split_type is BT, and the current block is a middle sub-block, then the partition direction for the current block pt_split_dir is not parsed and is inferred according to the partition direction of the parent block (i.e. pt_split_dir=ptDir==HOR?VER:HOR). When the partition type of the parent block ptType is TT, the partition type for the current block pt_split_type is TT, and the current block is not a middle sub-block, then the partition direction for the current block pt_split_dir is not parsed and is inferred according to the partition direction of the parent block (i.e. pt_split_dir=ptDir==HOR?VER:HOR).

Similarly, the third and fourth methods are also modified to infer the partition direction according to the partition type if the alternative parsing method is applied. According to the third method, a bottom sub-block generated by horizontal BT partitioning cannot be further split by vertical TT partitioning if a top sub-block is already split by vertical TT partitioning, and a right sub-block generated by vertical BT partitioning cannot be further split by horizontal TT partitioning if a left sub-block is already split by horizontal TT partitioning. In the modified third method, the partition direction for splitting the second sub-block, that is the bottom sub-block or the right sub-block, may be inferred according to the partition type for splitting the second sub-block. For example, the partition direction for splitting the bottom sub-block generated by horizontal BT partitioning does not need to be signaled and may be inferred to be horizontal partitioning if the partition type is TT partitioning and the top sub-block is already split by vertical TT partitioning. The modified third method does not need to signal the partition direction for splitting the right sub-block generated by vertical BT partitioning if the partition type is TT partitioning and the left sub-block is already split by horizontal TT partitioning. The partition direction is inferred to be vertical partitioning.

According to the fourth method, a bottom sub-block generated by horizontal TT partitioning cannot be further split by vertical BT partitioning if both the top and middle sub-blocks split from the same parent block are further split by vertical BT partitioning; and a right sub-block generated by vertical TT partitioning cannot be further split by horizontal BT partitioning if both the left and middle sub-blocks split from the same parent block are further split by horizontal BT partitioning. In the modified fourth method, the partition direction for splitting the third sub-block, that is either the bottom sub-block or the right sub-block, may be inferred according to the partition type. For example, the partition direction for splitting the bottom sub-block generated by horizontal TT partitioning does not need to be signaled and may be inferred to be horizontal partitioning if the partition type is BT partitioning and both the top and middle sub-blocks generated from the same parent block are further split by vertical BT partitioning. The partition direction for splitting the right sub-block generated by vertical TT partitioning does not need to be signaled and may be inferred to be vertical partitioning if the partition type is BT partitioning and both the left and middle sub-block generated from the same parent block are further split by horizontal BT partitioning.

IMPLEMENTATION EXAMPLES

Various embodiments of constrained block partitioning in video processing described in the present invention may be implemented in Intra Prediction 110 or Inter Prediction 112 of the Video Encoder 100 or Entropy Decoder 210 of the Video Decoder 200. Intra Prediction 110, Inter Prediction 112, and Entropy Decoder 210 may be implemented by hardware components, one or more processors configured to execute program instructions stored in a memory, or a combination of hardware and processor. The software codes or firmware codes may be developed in different programming languages and different formats or styles. The software codes may also be compiled for different target platforms. However, different code formats, styles and languages of software codes and other means of configuring codes to perform the tasks in accordance with the invention will not depart from the spirit and scope of the invention. For example, a processor executes program instructions to control receiving of input data associated with a current picture. The processor is equipped with a single or multiple processing cores. For example, the processor executes program instructions to perform functions of one or a combination of the first, second, third, and fourth methods, and the memory electrically coupled with the processor is used to store the program instructions, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. The Video Encoder 100 and Video Decoder 200 may be implemented in the same electronic device, so various functional components of the Video Encoder 100 and Video Decoder 200 may be shared or reused if implemented in the same electronic device.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video processing for a video coding system, the method comprising:
receiving input data associated with a current block in a current picture, wherein the current block is split from a parent block;
determining if the parent block is split by horizontal triple tree (TT) partitioning or vertical TT partitioning;
determining whether the current block is a middle sub-block in the parent block;
determining a partition type and a partition direction for splitting the current block by prohibiting a horizontal partitioning type according to whether the current block is the middle sub-block of the parent block if the parent block is split by horizontal TT partitioning, and prohibiting a vertical partitioning type according to whether the current block is the middle sub-block of the parent block if the parent block is split by vertical TT partitioning, wherein the prohibited horizontal partitioning type is horizontal binary tree (BT) partitioning and the prohibited vertical partitioning type is vertical BT partitioning when the current block is the middle sub-block of the parent block; and
processing the current block according to the partition type and partition direction.

2. The method of claim 1, wherein the prohibited horizontal partitioning type is horizontal TT partitioning and the prohibited vertical partitioning type is vertical TT partitioning when the current block is not the middle sub-block of the parent block.

3. The method of claim 1, wherein the partition type for splitting the current block is not signaled and is inferred to be TT partitioning if the parent block is split by horizontal TT partitioning, the current block is the middle sub-block of the parent block, and the partition direction is horizontal partitioning; or the partition type for splitting the current block is not signaled and is inferred to be TT partitioning if the parent block is split by vertical TT partitioning, the current block is the middle sub-block of the parent block, and the partition direction is vertical partitioning.

4. The method of claim 1, wherein the partition direction for splitting the current block is not signaled and is inferred to be vertical partitioning if the parent block is split by horizontal TT partitioning, the current block is the middle sub-block of the parent block, and the partition type is BT partitioning; or the partition direction for splitting the current block is not signaled and is inferred to be horizontal partitioning if the parent block is split by vertical TT partitioning, the current block is the middle sub-block of the parent block, and the partition type is BT partitioning.

5. The method of claim 1, wherein the partition type for splitting the current block is not signaled and is inferred to be BT partitioning if the parent block is split by horizontal TT partitioning, the current block is not the middle sub-block of the parent block, and the partition direction is horizontal partitioning; or the partition type for splitting the current block is not signaled and is inferred to be BT partitioning if the parent block is split by vertical TT partitioning, the current block is not the middle sub-block of the parent block, and the partition direction is vertical partitioning.

6. The method of claim 1, wherein the partition direction for splitting the current block is not signaled and is inferred to be vertical partitioning if the parent block is split by horizontal TT partitioning, the current block is not the middle sub-block of the parent block, and the partition type is TT partitioning; or the partition direction for splitting the current block is not signaled and is inferred to be horizontal partitioning if the parent block is split by vertical TT partitioning, the current block is not the middle sub-block of the parent block, and the partition type is TT partitioning.

7. A method of video processing for a video coding system, the method comprising:
receiving input data associated with a current block in a current picture, wherein the current block is a second sub-block split from a parent block by binary tree (BT) partitioning or the current block is a third sub-block split from a parent block by triple tree (TT) partitioning;
determining a parent partition type and a parent partition direction for splitting the parent block, wherein the partition type is selecting from BT partitioning and TT partitioning, and the partition direction is selecting from horizontal partitioning and vertical partitioning;
determining if a first sub-block split from the parent block by BT partitioning or both first and second sub-blocks split from the parent block by TT partitioning is/are further split by a first partition type different from the parent partition type and a first partition direction different from the parent partition direction;
determining a current partition type and a current partition direction for splitting the current block by prohibiting splitting the current block by the first partition type and the first partition direction; and
processing the current block according to the current partition type and the current partition direction.

8. The method of claim 7, wherein the first sub-block and second sub-block split from the parent block are top and bottom sub-blocks respectively if the parent block is split by horizontal BT partitioning, and the first sub-block and second sub-block split from the parent block are left and right sub-blocks respectively if the parent block is split by vertical BT partitioning.

9. The method of claim 7, wherein the first partition type and the first partition direction for splitting the first sub-block are TT partitioning and vertical partitioning if the parent block is split by horizontal BT partitioning, and the first partition type and the first partition direction for splitting the first sub-block are TT partitioning and horizontal partitioning if the parent block is split by vertical BT partitioning.

10. The method of claim 7, wherein the first sub-block, second sub-block, and third sub-block split from the parent block are top, middle, and bottom sub-blocks respectively if the parent block is split by horizontal TT partitioning, and the first sub-block, second sub-block, and third sub-block split from the parent block are left, middle, and right sub-blocks respectively if the parent block is split by vertical TT partitioning.

11. The method of claim 7, wherein the first partition type and the first partition direction for splitting the first and second sub-blocks are BT partitioning and vertical partitioning if the parent block is split by horizontal TT partitioning, and the first partition type and the first partition direction for splitting the first and second sub-blocks are BT partitioning and horizontal partitioning if the parent block is split by vertical TT partitioning.

12. The method of claim 7, wherein the current partition type is not signaled and is inferred to be BT partitioning if the current partition direction is vertical partitioning, the parent block is split by horizontal BT partitioning and the first sub-block is further split by vertical TT partitioning, and the current partition type is not signaled and is inferred to be BT partitioning if the current partition direction is horizontal partitioning, the parent block is split by vertical BT partitioning and the first sub-block is further split by horizontal TT partitioning.

13. The method of claim 7, wherein the current partition type is not signaled and is inferred to be TT partitioning if the current partition direction is horizontal partitioning, the parent block is split by vertical TT partitioning and the first and second sub-blocks are further split by horizontal BT partitioning, and the current partition type is not signaled and is inferred to be TT partitioning if the current partition direction is vertical partitioning, the parent block is split by horizontal TT partitioning and the first and second sub-blocks are further split by vertical BT partitioning.

14. The method of claim 7, wherein the current partition direction is not signaled and is inferred to be horizontal partitioning if the current partition type is TT partitioning, the parent block is split by horizontal BT partitioning and the first sub-block is further split by vertical TT partitioning, and the current partition direction is not signaled and is inferred to be vertical partitioning if the current partition type TT partitioning, the parent block is split by vertical BT partitioning, and the first sub-block is further split by horizontal TT partitioning.

15. The method of claim 7, wherein the current partition direction is not signaled and is inferred to be horizontal partitioning if the current partition type is BT partitioning, the parent block is split by horizontal TT partitioning and the first and second sub-blocks are further split by vertical BT partitioning, and the current partition direction is not signaled and is inferred to be vertical partitioning if the current partition type BT partitioning, the parent block is split by vertical TT partitioning, and the first sub-block is further split by horizontal BT partitioning.

16. An apparatus of processing video data in a video coding system, the apparatus comprising one or more electronic circuits configured for:
receiving input data associated with a current block in a current picture, wherein the current block is split from a parent block;
determining if the parent block is split by horizontal triple tree (TT) partitioning or vertical TT partitioning;
determining whether the current block is a middle sub-block in the parent block;
determining a partition type and a partition direction for splitting the current block by prohibiting a horizontal partitioning type according to whether the current block is the middle sub-block of the parent block if the parent block is split by horizontal TT partitioning, and prohibiting a vertical partitioning type according to whether the current block is the middle sub-block of the parent block if the parent block is split by vertical TT partitioning, wherein the prohibited horizontal partitioning type is horizontal binary tree (BT) partitioning and the prohibited vertical partitioning type is vertical BT partitioning when the current block is the middle sub-block of the parent block; and processing the current block according to the partition type and partition direction.

17. A non-transitory computer readable medium storing program instruction causing a processing circuit of an apparatus to perform video processing method, and the method comprising:

receiving input data associated with a current block in a current picture, wherein the current block is split from a parent block;

determining if the parent block is split by horizontal triple tree (TT) partitioning or vertical TT partitioning;

determining whether the current block is a middle sub-block in the parent block;

determining a partition type and a partition direction for splitting the current block by prohibiting a horizontal partitioning type according to whether the current block is the middle sub-block of the parent block if the parent block is split by horizontal TT partitioning, and prohibiting a vertical partitioning type according to whether the current block is the middle sub-block of the parent block if the parent block is split by vertical TT partitioning, wherein the prohibited horizontal partitioning type is horizontal binary tree (BT) partitioning and the prohibited vertical partitioning type is vertical BT partitioning when the current block is the middle sub-block of the parent block; and processing the current block according to the partition type and partition direction.

18. An apparatus of processing video data in a video coding system, the apparatus comprising one or more electronic circuits configured for:

receiving input data associated with a current block in a current picture, wherein the current block is a second sub-block split from a parent block by binary tree (BT) partitioning or the current block is a third sub-block split from a parent block by triple tree (TT) partitioning;

determining a parent partition type and a parent partition direction for splitting the parent block, wherein the partition type is selecting from BT partitioning and TT partitioning, and the partition direction is selecting from horizontal partitioning and vertical partitioning;

determining if a first sub-block split from the parent block by BT partitioning or both first and second sub-blocks split from the parent block by TT partitioning is/are further split by a first partition type different from the parent partition type and a first partition direction different from the parent partition direction;

determining a current partition type and a current partition direction for splitting the current block by prohibiting splitting the current block by the first partition type and the first partition direction; and processing the current block according to the current partition type and the current partition direction.

19. A non-transitory computer readable medium storing program instruction causing a processing circuit of an apparatus to perform video processing method, and the method comprising:

receiving input data associated with a current block in a current picture, wherein the current block is a second sub-block split from a parent block by binary tree (BT) partitioning or the current block is a third sub-block split from a parent block by triple tree (TT) partitioning;

determining a parent partition type and a parent partition direction for splitting the parent block, wherein the partition type is selecting from BT partitioning and TT partitioning, and the partition direction is selecting from horizontal partitioning and vertical partitioning;

determining if a first sub-block split from the parent block by BT partitioning or both first and second sub-blocks split from the parent block by TT partitioning is/are further split by a first partition type different from the parent partition type and a first partition direction different from the parent partition direction;

determining a current partition type and a current partition direction for splitting the current block by prohibiting splitting the current block by the first partition type and the first partition direction; and processing the current block according to the current partition type and the current partition direction.

* * * * *